(12) United States Patent
Hogue

(10) Patent No.: US 9,023,459 B2
(45) Date of Patent: May 5, 2015

(54) LAMINATE MATERIAL HAVING A DECORATIVE APPEARANCE AND METHOD OF MANUFACTURE

(75) Inventor: Neil Fredrick Hogue, Paso Robles, CA (US)

(73) Assignee: Hogue, Inc., Paso Robles, CA (US)

( * ) Notice: Subject to any disclaimer, the term of this patent is extended or adjusted under 35 U.S.C. 154(b) by 289 days.

(21) Appl. No.: 12/798,186

(22) Filed: Mar. 30, 2010

(65) Prior Publication Data

US 2011/0244194 A1 Oct. 6, 2011

(51) Int. Cl.
| B32B 1/00 | (2006.01) |
| B32B 3/00 | (2006.01) |
| B32B 3/28 | (2006.01) |
| B32B 3/30 | (2006.01) |
| B32B 5/12 | (2006.01) |
| B32B 5/26 | (2006.01) |
| B23B 27/08 | (2006.01) |
| B32B 27/38 | (2006.01) |
| B32B 27/40 | (2006.01) |
| B32B 27/42 | (2006.01) |
| B32B 37/10 | (2006.01) |
| B44C 3/02 | (2006.01) |
| F41B 13/08 | (2006.01) |

(Continued)

(52) U.S. Cl.
CPC ... *B32B 3/00* (2013.01); *B32B 5/12* (2013.01); *B32B 5/26* (2013.01); *B23B 27/08* (2013.01); *B32B 27/38* (2013.01); *B32B 27/40* (2013.01); *B32B 27/42* (2013.01); *B32B 37/10* (2013.01); *B32B 37/182* (2013.01); *B32B 2309/022* (2013.01); *B32B 2309/025* (2013.01); *B32B 2309/125* (2013.01); *B32B 2451/00* (2013.01); *B44C 3/025* (2013.01); *F41B 13/08* (2013.01); *F41C 23/10* (2013.01); *F41C 23/18* (2013.01); *B32B 41/00* (2013.01)

(58) Field of Classification Search
USPC ................ 428/187, 174, 172, 542.2; 81/489; 30/340; 42/71.02
See application file for complete search history.

(56) References Cited

U.S. PATENT DOCUMENTS 4,067,947 A * 1/1978 Miori ............................. 264/154
4,161,818 A * 7/1979 Phelps ............................ 30/157

(Continued)

OTHER PUBLICATIONS

VZ Grips Diamond Backs USMC Camo G10, Jan. 14, 2010.

(Continued)

*Primary Examiner* — Maria Veronica Ewald
*Assistant Examiner* — Nathan Van Sell
(74) *Attorney, Agent, or Firm* — Bennet K. Langlotz; Langlotz Patent & Trademark Works, Inc.

(57) ABSTRACT

A laminate material having a decorative appearance has a plurality of layers that are bonded together with at least one of the layers having a first orientation. A portion of at least one of the layers adjacent to an exterior surface of the material is deviated into a second orientation differing from the first orientation. The exterior surface of the material is substantially flat, thereby revealing multiple layers at the exterior surface. Each layer may comprise a sheet that is pre-impregnated with a thermosetting resin. A form having a surface feature may be pressed into the exterior surface of the material while the layers are bonded together to deviate a portion of at least one of the layers adjacent to an exterior surface of the material into the second orientation. The invention also includes a method of generating a laminate material having a decorative appearance.

11 Claims, 7 Drawing Sheets

(51) Int. Cl.
  *F41C 23/10* (2006.01)
  *F41C 23/18* (2006.01)
  *B32B 37/18* (2006.01)
  *B32B 41/00* (2006.01)

(56) References Cited

U.S. PATENT DOCUMENTS

| | | | | |
|---|---|---|---|---|
| 4,816,318 | A * | 3/1989 | Dorsey et al. | 428/167 |
| 5,429,852 | A * | 7/1995 | Quinn | 428/71 |
| 5,615,508 | A * | 4/1997 | Miller et al. | 42/71.01 |
| 5,797,207 | A * | 8/1998 | Marable et al. | 42/71.02 |
| 6,214,439 | B1 * | 4/2001 | Meneghin et al. | 428/141 |
| 6,902,792 | B2 * | 6/2005 | Wang | 428/174 |
| 7,937,874 | B2 * | 5/2011 | Roth | 42/72 |
| 2002/0119292 | A1 * | 8/2002 | Venkatasanthanam et al. | 428/174 |
| 2004/0109980 | A1 * | 6/2004 | Chen et al. | 428/131 |
| 2004/0234727 | A1 * | 11/2004 | Wang | 428/174 |
| 2005/0144790 | A1 * | 7/2005 | Stanley, Jr. | 30/350 |
| 2005/0266221 | A1 * | 12/2005 | Karam et al. | 428/292.1 |
| 2006/0177635 | A1 * | 8/2006 | Pepe et al. | 428/174 |
| 2007/0113459 | A1 * | 5/2007 | Stout et al. | 42/71.01 |
| 2007/0149079 | A1 * | 6/2007 | Vito et al. | 442/181 |
| 2008/0185753 | A1 * | 8/2008 | Takano et al. | 264/239 |

OTHER PUBLICATIONS

KnifeKits.com 3DG 10-130-RBK, Jan. 14, 2010.
http://en.wikipedia.org/wiki/Pattern_welding, Dated Printed: 2013.
http://en.wikipedia.org/wiki/Damascus_Steel, Date Printed: 2013.

* cited by examiner

LAMINATE MATERIAL HAVING A DECORATIVE APPEARANCE AND METHOD OF MANUFACTURE

FIELD OF THE INVENTION

The present invention relates to a laminate material having a decorative appearance, and more particularly to a material that can be machined into sturdy and attractive pistol grips and knife handles.

BACKGROUND OF THE INVENTION

It is often desirable to machine thermosetting laminate materials into pistol grips and knife handles because such materials are durable, lightweight, and moisture resistant. Laminate materials are mechanically and dimensionally stable and can be machined to tight tolerances. Such materials are amenable to being milled and carved, enabling textures to be added to their outer surfaces. Furthermore, machining of a laminate material consisting of layers having different colors enables desirable aesthetic effects to be created by exposing different colored layers in different locations on the material.

A very popular and versatile example of one such thermosetting laminate material is G-10/FR-4. The FR-4 version of G-10 is fire retardant. It is a high-pressure thermoset plastic laminate consisting of multiple layers of woven fiberglass mesh cloth impregnated with an epoxy resin binder. The sheets may be of the same color. Alternatively, sheets of multiple colors can be used to create the final product. The epoxy resin imparts the color to the sheets, and may provide additional color variety. The actual cloth can also be of different colors.

G-10/FR-4 has been predominantly used in relatively thin sheets as the insulating substrate for the vast majority of rigid printed circuit boards. G-10/FR4 is also used in a wide variety of other electrical and mechanical applications, including structural supports, buss bars, mechanical insulation, gears, test fixtures, washers, spacers, and tight tolerance machined parts for electromechanical assemblies. More recently, thicker sheets of G-10/FR-4 have been used to produce knife handles and pistol grips. The use of this material in these two new applications is rapidly growing in popularity.

Production of the G-10/FR-4 material starts with the cloth sheets pre-impregnated with a resin material. These sheets are loaded onto a staging table layer by layer to achieve the desired thickness and color pattern of the final sheet of material. The stacked layers then are loaded into a press between two flat platens. Utilizing high heat and high pressure, the two platens of the press form the sheets and layers together into one thicker sheet of material via polymerization. The material now consists of several layers (and colors if layers having different colors have been used). The standard method of production produces only flat, horizontally stacked layers one on top of the other. The material is typically then cut to the desired size for the finished product in which it will be used.

One of two types of press cycles is typically used to produce G-10/FR-4 material. The first cycle type is a two temperature step, two pressure step process shown in FIG. 1A. The platens are initially heated to 140° C. before they contact the sheets, then raised to the temperature of 185° C., and then gradually returned to ambient temperature. Kiss pressure is initially applied, then the pressure is increased to 400+/−50 psi, and then the pressure is lowered to 40+/−10 psi.

The second press cycle type is a one temperature step, two pressure step process shown in FIG. 1B. The platens are initially heated to 185° C. before they contact the sheets and are maintained at that temperature until they are gradually returned to ambient temperature. Kiss pressure is initially applied, then the pressure is increased to 400+/−50 psi, and then the pressure is lowered to 40+/−10 psi.

Regardless of the type of press cycle chosen, the heating rate of the material between 70° C. and 140° C. should be maintained at 1-3° C./minute, with 1.5-2.5° C./minute being preferable. The temperature of the material must be above 170° C. for at least 40 minutes to enable the epoxy resin to fully cure. The pressure should be kept below 100 psi while the material cools to ambient temperature. The cooling rate of the material should be kept below 2.5° C./minute while the temperature of the material exceeds 100° C. in order to avoid introducing twist.

An example of a pistol grip achieving desirable aesthetic effects by using G-10 material is the Diamond Backs USMC Camo G10 manufactured by VZ Grips of Tallahassee, Fla. This pistol grip is made by forming the G-10 from a cloth sheet with different colors or patterns printed on it before the sheet is impregnated with resin. The G-10 is then is milled to produce a highly slip resistant outer surface. The edges are also milled and through holes are bored so the pistol grip fits the frame of a M1911 pistol and can be secured to the frame with grip screws. This technique only imparts different colors or patterns to a single layer. While it provides a desirable aesthetic effect, it does not expose different color layers at different depths.

An example of a knife handle material achieving desirable aesthetic effects by exposing different colored layers in different locations on G-10 material is the 3DG10-130-RBK available from CKK Industries, Inc. of Haralson, Ga. This knife handle material is a two-color laminated G-10 material. It can be carved, milled, or edge-filed to expose different color layers in different locations and shape the material to receive a knife blade.

However, there are limitations to the types of aesthetic effects that can be achieved, particularly if a flat outer surface is desired. This is the case because all layers of conventional G-10 material are horizontally stacked in parallel planes. As a result, a flat surface either is limited to a single color if cut parallel to the G-10 layers or a woodgrain-like appearance if cut at an angle to the G-10 layers. Other limited patterns are provided if the surface has a non-flat contour, revealing the layers in different but limited ways.

It is therefore an object of this invention to provide a laminate material having a decorative appearance that can be machined into sturdy and attractive pistol grips and knife handles having predominantly flat surfaces.

SUMMARY OF THE INVENTION

The present invention provides an improved laminate material having a decorative appearance, and overcomes the above-mentioned disadvantages and drawbacks of the prior art. As such, the general purpose of the present invention, which will be described subsequently in greater detail, is to provide an improved laminate material having a decorative appearance that has all the advantages of the prior art mentioned above.

To attain this, the preferred embodiment of the present invention essentially comprises a laminate material having a decorative appearance having a plurality of layers that are bonded together with at least one of the layers having a first orientation. A portion of at least one of the layers adjacent to an exterior surface of the material is deviated into a second orientation differing from the first orientation. The exterior surface of the material is substantially flat, thereby revealing multiple layers at the exterior surface. Each layer may comprise a sheet that is pre-impregnated with a thermosetting resin. A form having a surface feature may be pressed into the exterior surface of the material while the layers are bonded together to deviate a portion of at least one of the layers adjacent to an exterior surface of the material into the second orientation. The invention also includes a method of generating a laminate material having a decorative appearance. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1A:
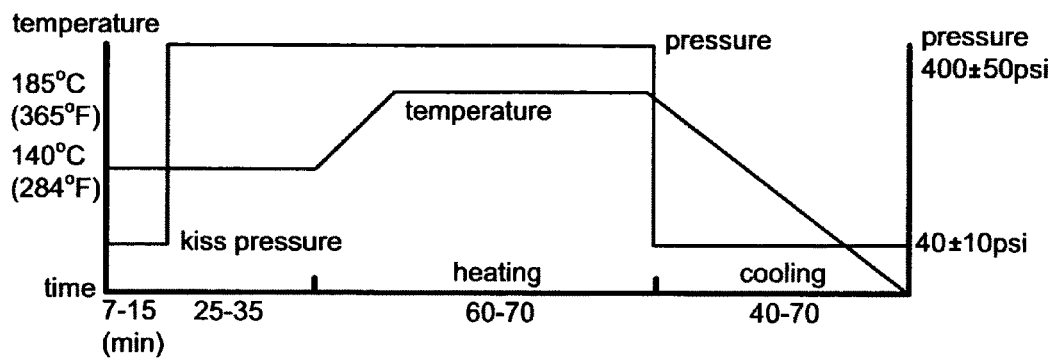
FIG. 1A is a chart of a two temperature step/two pressure step press cycle for the production of G-10 material.
Figure 1B:
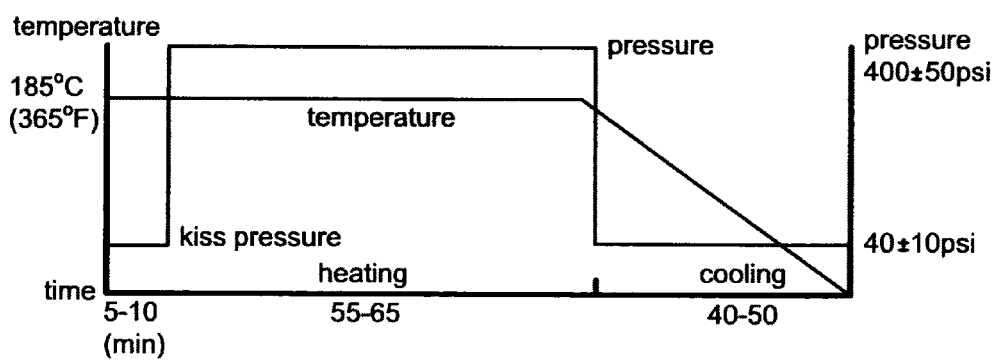
FIG. 1B is a chart of a one temperature step/two pressure step press cycle for the production of G-10 material.

An embodiment of the laminate material having a decorative appearance of the present invention is shown and generally designated by the reference numeral 10.

Figure 2:
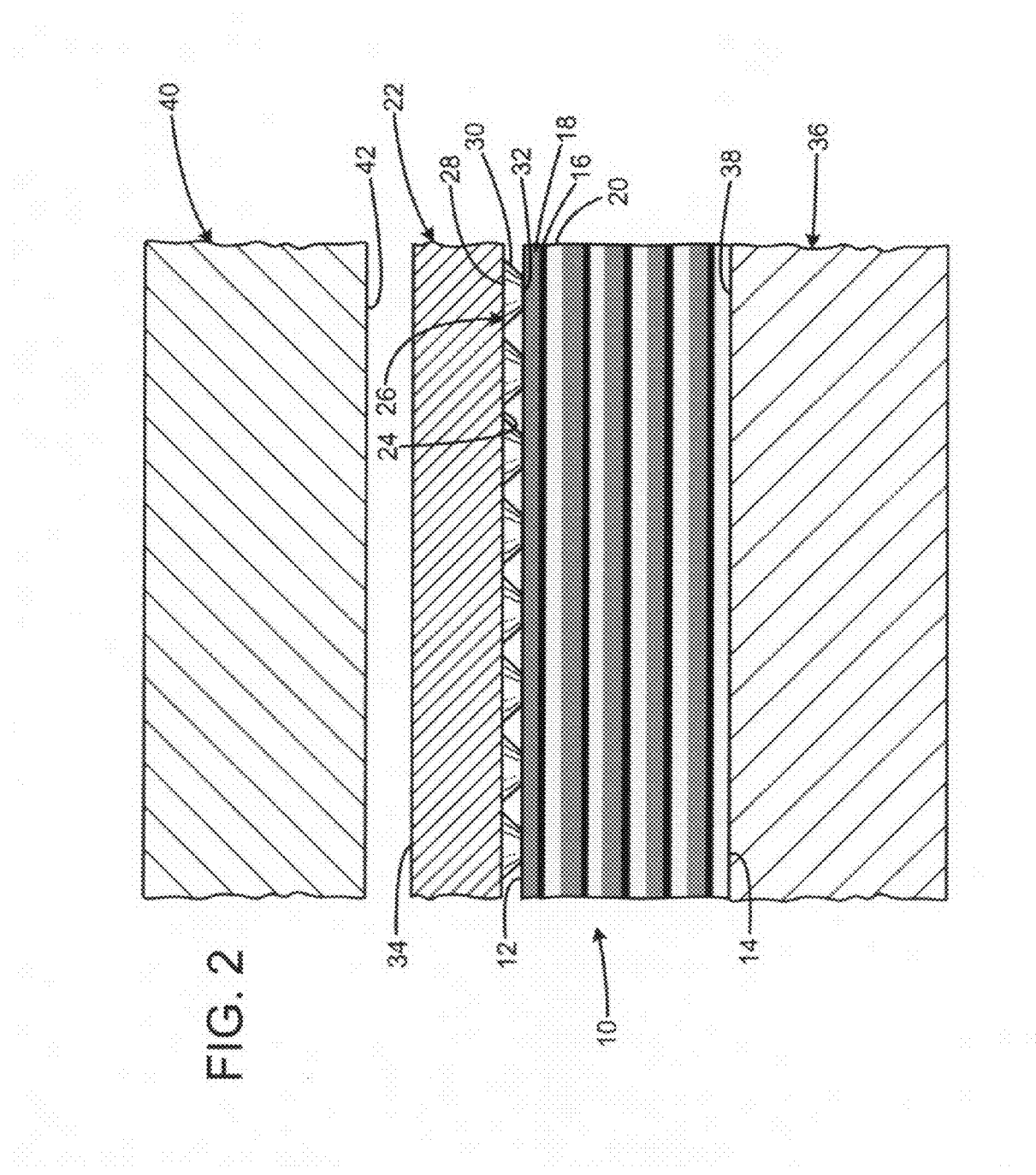
FIG. 2 is a cross-section view of the laminate material having a decorative appearance of the present invention loaded into a press prior to heat and pressure being applied.

FIG. 2 illustrates the first step in the manufacture of the improved laminate material having a decorative appearance 10 of the present invention. More particularly, the process to produce the laminate material is similar to the conventional process used to produce G-10/FR-4. Stacked pre-impregnated fiberglass mesh sheets (16, 18, 20) are loaded into a press between the bottom surface 42 of a top platen 40 and the top surface 38 of a bottom platen 36. The platens are each 48 inches×96 inches. In the current embodiment, each of the sheets is 0.008 inches thick, and the stacked sheets consist of repeating layers of olive drab green 18, black 16, and tan 20 (with these colors being selected to provide an example that results in a common military camouflage effect, with unlimited other color choices being suitable for any other application under the preferred embodiment).

A form 22 is then placed with its bottom 24 on top of the top 12 of the stacked sheets. However, the form can be placed on the bottom platen with the stacked layers on top of the form, or forms can be located both above and below the stacked sheets. Alternatively, the form can be an integral part of one or both of the platens.

In the current embodiment, each olive drab green layer has three sheets, each black layer has one sheet, and each tan layer has two sheets. However, each of the layers can be of any color and contain any desired quantity of sheets. Furthermore, each sheet can have any desired thickness. In addition to fiberglass, the sheets may include but are not limited to pre-impregnated sheets made from glass, fabric, canvas, linen, paper, carbon fiber, and twill. The laminate material of the present invention can mix and match sheets having different materials together. There is no limit to the number of colors employed, except for the number of sheets employed. The sheets themselves may impart a color to the laminate material in addition to any color imparted by their binder. The sheets can be impregnated with several different types of resin binders. These resin binders can be of any available color and may include but are not limited to epoxy, phenolic, silicone, melamine, and urethane resins.

Figure 3:
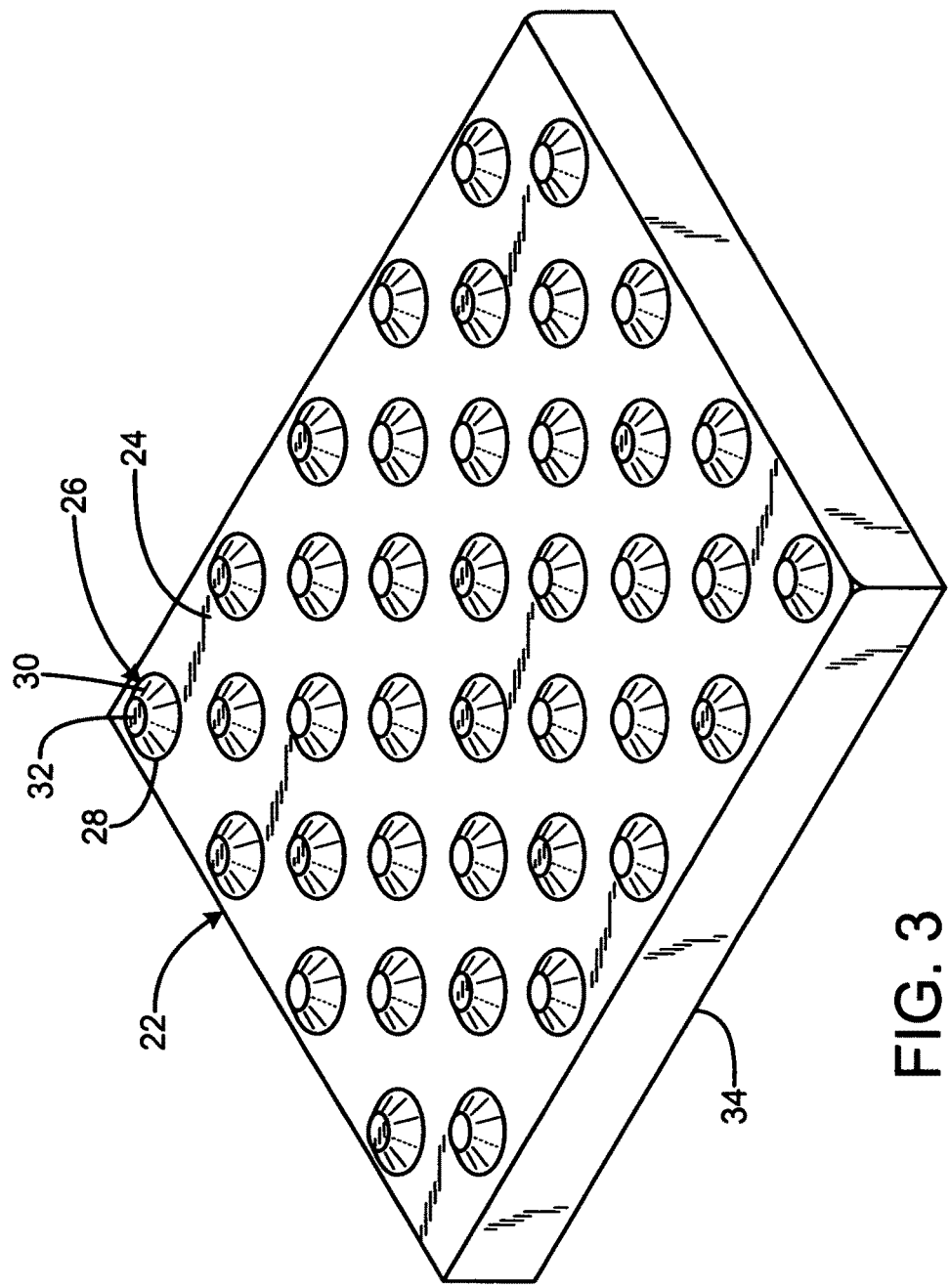
FIG. 3 is a bottom perspective view of the form used to shape the laminate material having a decorative appearance of the present invention while heat and pressure are applied.

FIG. 3 illustrates the improved form 22 of the present invention, showing one of unlimited forms that may be employed to generate different results under the preferred embodiment of the invention. More particularly, the form 22 has a flat bottom surface 24 with a series of conical protrusion features 26 rising from it and a flat top surface 34 that is parallel to the bottom surface. The distance between the bottom surface and the top surface is 0.415 inch. Each of the protrusions has a base 28, a side wall 30, and an apex 32. In the current embodiment, the protrusions are conic sections whose apex is truncated into a circular surface that is parallel to the bottom and top surfaces of the form. The apex of each protrusion has a diameter of 0.1425 inch. The base of each protrusion has a diameter of 0.3125 inch and intersects with the bottom surface with a radius of curvature of 0.03 inch. The centers of the protrusions are spaced apart by 0.7212 inch. The side wall of each protrusion is sloped at a 45° angle relative to the bottom surface. Each protrusion extends 0.085 inch above the bottom surface, giving the form a maximum thickness of 0.5 inch when measured perpendicularly from the apex of a protrusion to the top surface.

In the current embodiment, the form is made from 6061 T6 aircraft grade aluminum. However, the form can be made out of any suitably strong and thermally conductive material. The form must conduct heat or else the stacked sheets will not bond together properly. Heat must be transferred from the press platen through the form and into the stacked sheets abutting the form.

Although conical protrusions have been described, the form of the present invention can have protrusions and/or recesses of any suitable size, shape, and depth. These can include, but are not limited to linear ridges or waves, diamonds, logos, picture outlines, circles, squares, triangles, and any other polygon or shape, regular or irregular, curved or faceted. Text and other images may also be generated. Different depths of features on the form and different thicknesses of both the layers and the individual sheets impact the decorative appearance of the laminate material of the present invention.

The greater the depth or the taller the features on the form are, the larger the number of sheets of material are deviated from horizontal. The extent of deviation of those sheets closest to the form is increased relative to those further away from the form. Taller features on the form create increased bending of the layers. However, more of the top surface layers must be removed to flatten the top surface to uncover the decorative appearance, resulting in more wasted material and higher associated costs.

In addition, it is believed that the formed ridges make the resulting laminate material stronger in the direction of the ridges than conventional G-10/FR-4. Furthermore, a circuit board that would include pre-formed standoffs could be produced using an appropriate form, which would reduce the cost of final assembly.

The forms are 19.500 inches wide and 49 inches long in the current embodiment, and five forms are positioned next to each other to create a single surface of about 4 feet×8 feet. Sheets can be run at any size smaller than 4 feet×8 feet. The forms can be of any size, but these dimensions have been found to be preferred for reasons of weight and ease of machining. Furthermore, forms having different features can be used simultaneously in a single press run to achieve different decorative appearances on different portions of the stacked sheets.

Figure 4:
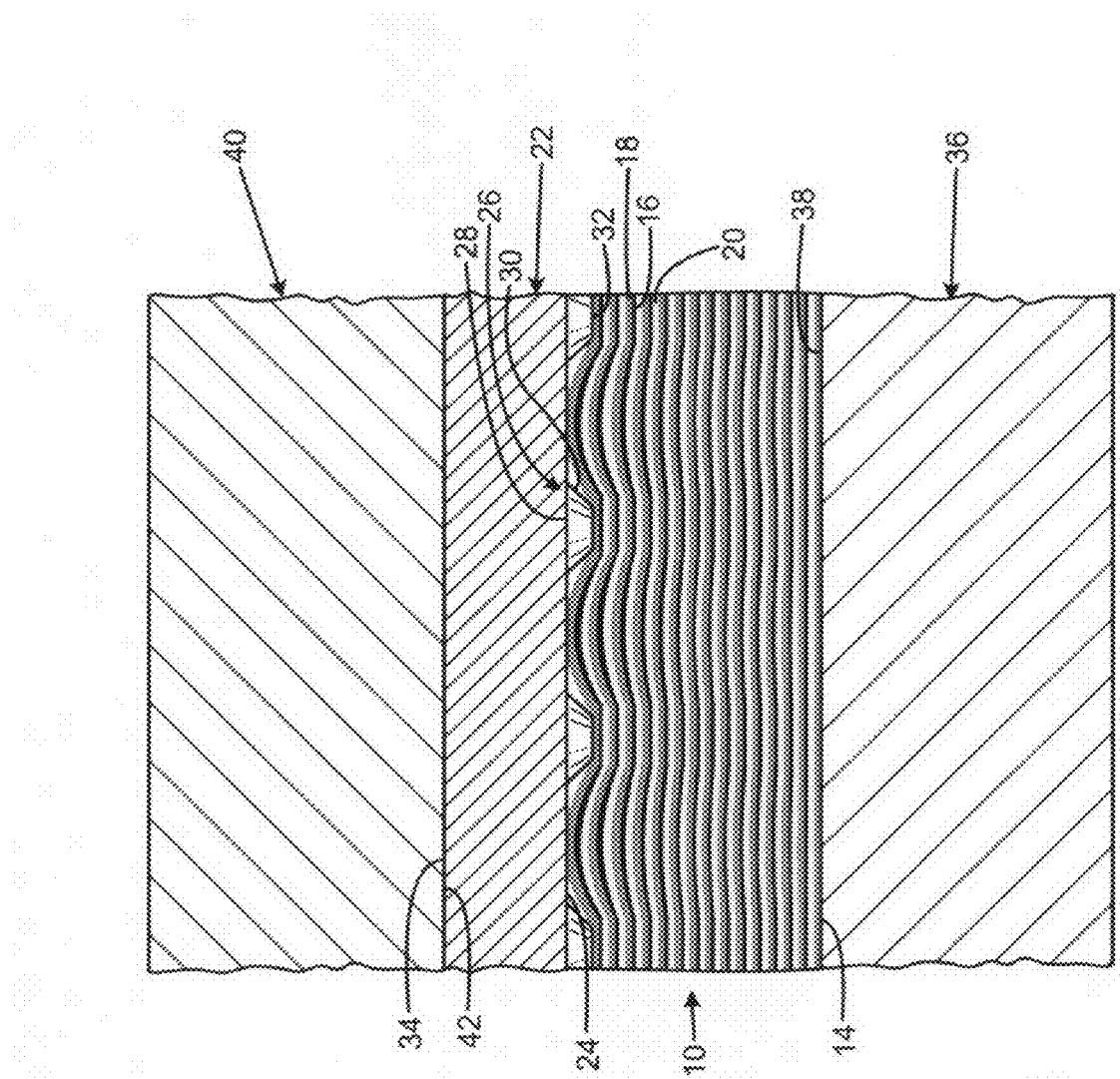
FIG. 4 is a cross-section view of the laminate material having a decorative appearance of the present invention loaded into a press while heat and pressure are applied.

FIG. 4 illustrates the second step in the manufacture of the improved laminate material having a decorative appearance 10 of the present invention. More particularly, heat and pressure are applied to the stacked layers by the platens and through the form. The layers closest to the form are deviated from horizontal most significantly and compacted more tightly together than those farthest from the form. The upper layers of material bend to closely conform to the shape of the form with the epoxy resin filling all voids between the uppermost sheet and the form. The rate and duration of application of heat and pressure to the stacked layers follows one of the two standard press cycles for manufacturing G-10/FR-4. In the current embodiment, the maximum temperature is 325° F. and the maximum pressure is 700 psi. However, the conventional maximum temperature and pressure used for conventional G-10 production can also be used.

Figure 5:
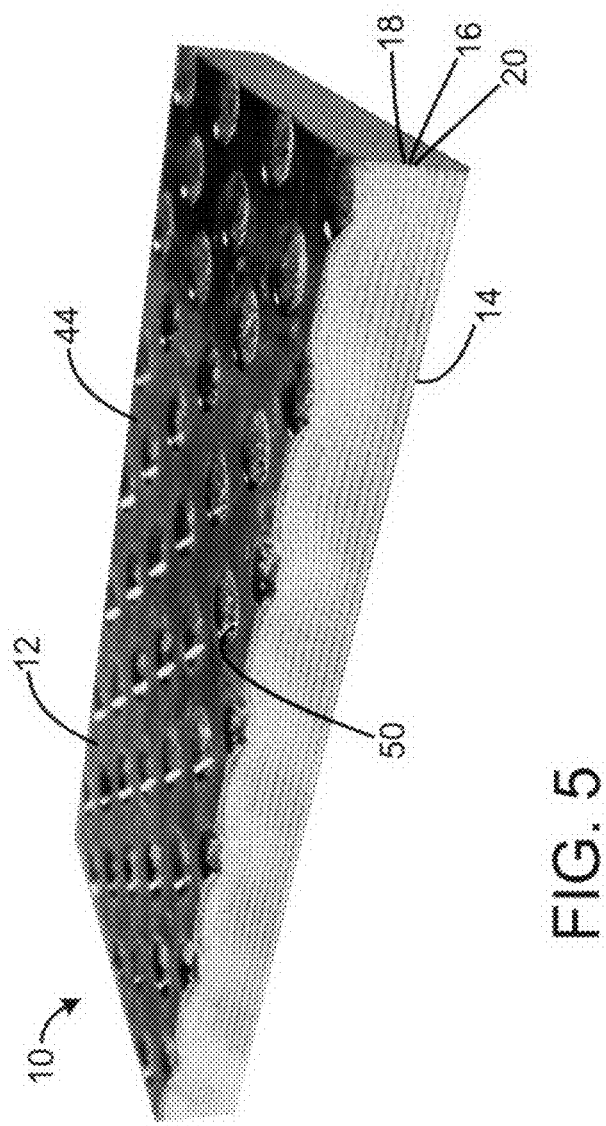
FIG. 5 is a top perspective view of the laminate material having a decorative appearance of the present invention constructed in accordance with the principles of the present invention.

FIG. 5 illustrates the improved laminate material having a decorative appearance 10 of the present invention after it has been removed from the press and cut on one side so its cross-section is visible. More particularly, the epoxy resin 44 from the uppermost layer of the stacked sheets has spread out around the protrusions to form a substantially flat top surface 12 in close conformance with the bottom surface 24 of the form 22. The protrusions 26 have created dimples 50 in the top surface of the laminate material. The dimples have a depth that is substantially equivalent to the height of the protrusions. The epoxy in all of the pre-impregnated sheets has polymerized to bond the sheets together into a single thicker sheet of laminate material.

Figure 6:
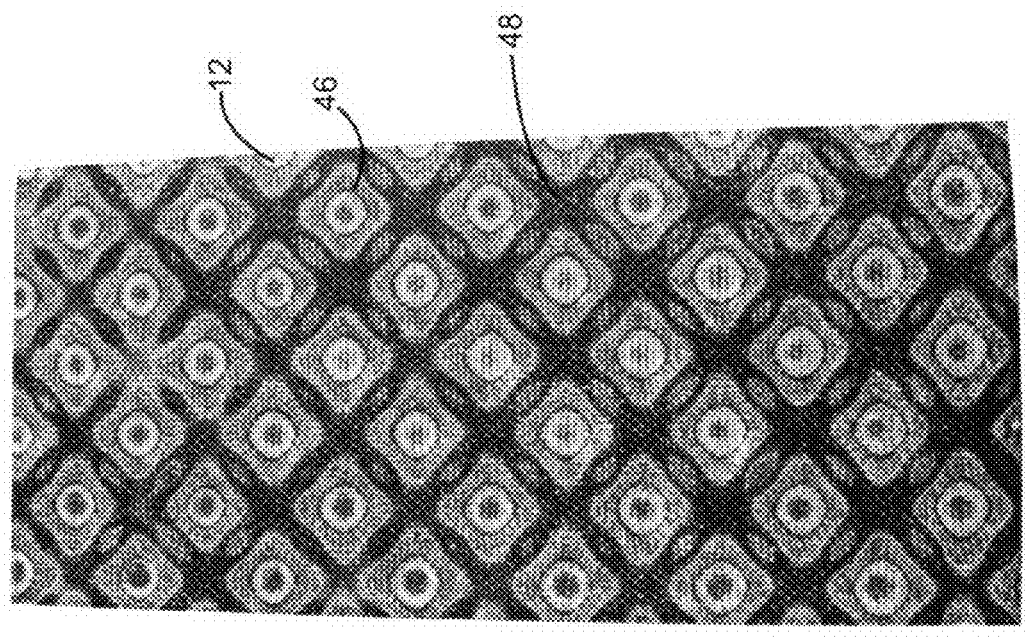
FIG. 6 is a top view of the laminate material having a decorative appearance of the present invention after the top surface has been machined away.

FIG. 6 illustrates the improved laminate material having a decorative appearance 10 of the present invention after sanding. More particularly, a portion of the laminate material has been removed from the top surface 12 so that the top surface is substantially flat. In the current embodiment, the equivalent of 16 pre-impregnated sheets is removed to eliminate the dimples. This action exposes a decorative appearance on the top surface resulting from the bending of the uppermost layers of the stacked sheets by the form 22 in the form of ring patterns 46 and bands 48.

In the current embodiment, the decorative appearance featuring ring patterns 46 resembles a type of Damascus steel resulting from pattern coining, which is very popular in the knife and gun industries. Pattern coining refers to a process of coining the knotty surface of a steel bar using a form. Once the coined portion is ground flat, the layers that were flattened by the form are visible as rings on the surface.

The laminate material of the present invention has a similar appearance to pattern coined Damascus steel once the surface that was adjacent to the form is sanded flat and oiled. However, the laminate material is stronger and lighter than steel, is not prone to corrosion, and can be manufactured in a wide range of colors. Furthermore, the laminate material is more readily machine with fine features and to tight tolerances than is steel. Finally, oil from the user's hand continues to polish the laminate material as it is handled, maintaining a lustrous appearance.

Figure 7:
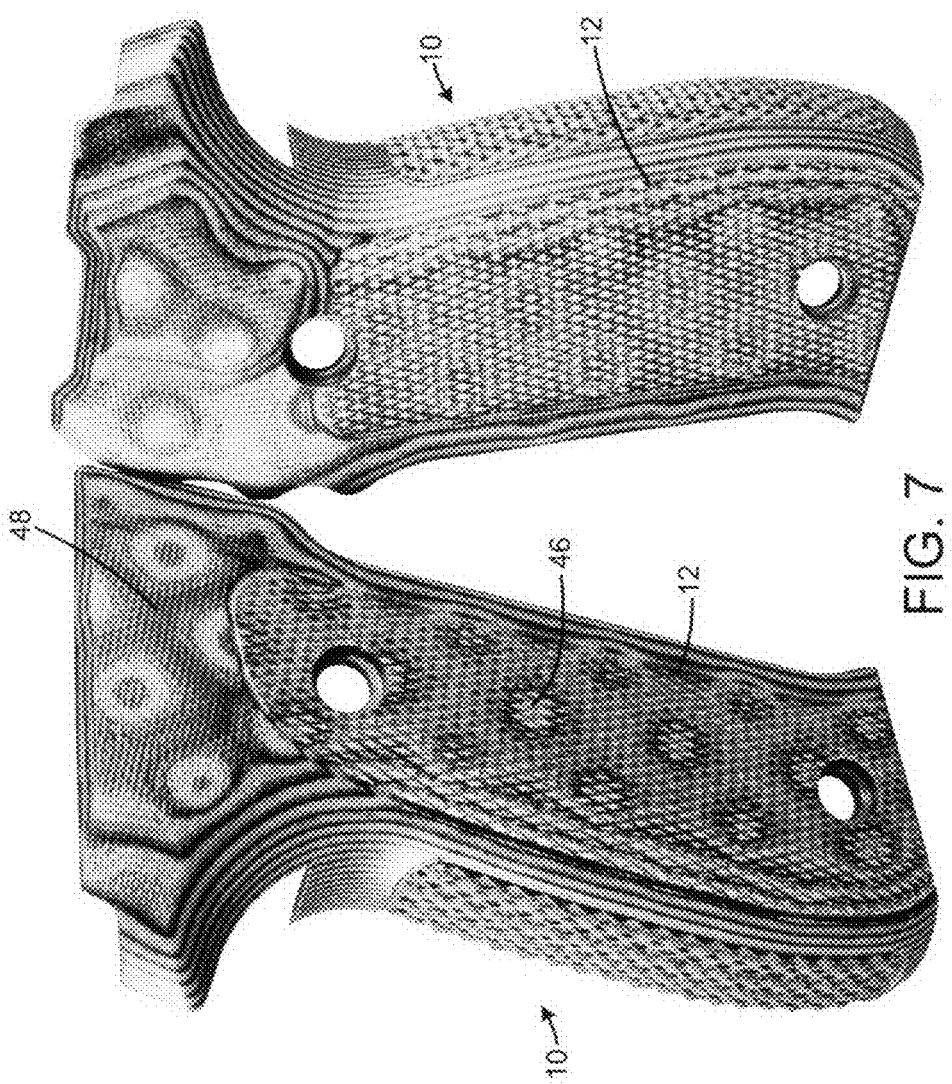
FIG. 7 is a top perspective view of the laminate material having a decorative appearance of the present invention machined into a pair of pistol grips.

FIG. 7 illustrates the improved laminate material having a decorative appearance 10 of the present invention after final machining. More particularly, two sheets of the laminate material having been milled into a pair of pistol grips. The laminate material can be shaped into a wide range of grip sizes, including but not limited to thicknesses from 0.18 inch to 1 inch and in widths and lengths ranging from 1.75 inches× 4.438 inches to 3 inches×5.5 inches.

The nature of the decorative appearance on each pistol grip is not only affected by the color and thickness of the layers forming the laminate material, but also by the extent of the exposed layers' deviation from horizontal and the angle at which they are cut. In general, the more shallow the angle at which a layer is cut, the more that layer will appear on the finished product. A nearly vertical exposed layer that is cut horizontally exposes a very narrow line of that layer, such as the ring pattern 46. A substantially horizontal exposed layer that is cut horizontally exposes a wider band of that layer, such as the band 48.

Advanced images may be generated by this process. For instance, a face or any other image may be created. The stack of layers may be a sequence of increasingly dark (or light) color. A grayscale image may be created with a stack ranging from black to white, with incremental grayscales in between. If the black is at a deeper depth, and white at the top, then the form is generated based on the desired image, with areas desired in lighter tones having greater protrusion from the surface of the form (so that the lighter layers are pushed down to the plane of sanding) and areas in darker tones having less or no protrusion, so that darker layers are revealed. Intermediate tones are generated by form surface protrusions of a proportional amount.

Color images in a cartoon or "paint by numbers" appearance may be generated by having a set of different color layers, with each layer being selectably accessed and revealed in the desired zone on the finished product by a form tool designed to have the appropriate protrusion amounts in the appropriate areas. The image of an American Flag could thus be generated by a stack with layers of red, white, and blue, with protrusions for the stars and white stripes one amount, and the levels corresponding to the blue field and red strips at different amounts.

While a current embodiment of the laminate material having a decorative appearance has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, while pistol grips and knife handles as described are the most likely contemplated application for the concepts of the present invention, it should be appreciated that the current invention could be used to form many products.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laminate material having a decorative appearance comprising:
    a first and second sheet bonded together over their entireties to form an integral structure;
    the integral structure defining a junction surface between the first and second sheets;
    the integral structure defining a plurality of spaced apart deviation zones;
    the junction surface being articulated with elevated portions associated with the deviation zones and remaining portions away from the deviation zones;
    the material having a top exterior surface having a first contour;
    a lower one of the first and second sheets forming the top exterior surface adjacent to the deviation zones; and
    an upper one of the first and second sheets forming the top exterior surface away from the deviation zones.

2. The material of claim 1 wherein each sheet is pre-impregnated with a thermosetting resin.

3. The material of claim 2 wherein each sheet is selected from the group comprising fiberglass, glass, fabric, canvas, linen, paper, carbon fiber, and twill.

4. The material of claim 2 wherein the thermosetting resin is selected from the group comprising epoxy, phenolic, silicone, melamine, and urethane resins.

5. The material of claim 1 wherein the junction surface is articulated into the deviation zones by a form having a surface feature that is pressed into the top exterior surface of the material while the sheets are bonded together.

6. The material of claim 1 wherein the sheets are bonded together by the application of heat and pressure.

7. The material of claim 1 wherein the material is adapted for a handgrip of a pistol.

8. The material of claim 1 wherein the material is adapted for a handgrip of a knife.

9. The material of claim 1 wherein at least one of the deviation zones revealed at the exterior surface comprises a ring pattern.

10. A laminate material having a decorative appearance comprising:
    a first sheet and a second sheet bonded together over their entireties in a stack to form an integral structure having a top exterior surface;
    the integral structure defining a junction surface between the first and second sheets;
    the integral structure defining a plurality of spaced apart deviation zones;
    the junction surface being articulated with elevated portions associated with the deviation zones and remaining portions away from the deviation zones;
    a lower one of the first and second sheets forming the top exterior surface adjacent to the deviation zones; and
    an upper one of the first and second sheets forming the top exterior surface away from the deviation zones.

11. The material of claim 10 wherein at least one of the deviation zones revealed at the exterior surface comprises a ring pattern.

* * * * *